(12) United States Patent
Ohno et al.

(10) Patent No.: US 8,226,227 B2
(45) Date of Patent: Jul. 24, 2012

(54) GLASSES FOR IMAGE VIEWING

(75) Inventors: Hiroshi Ohno, Tokyo (JP); Tatsuya Sakata, Tokyo (JP); Masamichi Okada, Kanagawa (JP); Nobuyuki Hara, Kanagawa (JP); Naoto Shimizu, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/807,603

(22) Filed: Sep. 9, 2010

(65) Prior Publication Data

US 2011/0069275 A1   Mar. 24, 2011

(30) Foreign Application Priority Data

Sep. 18, 2009   (JP) ................................ P2009-216816

(51) Int. Cl.
  *G02C 7/12*   (2006.01)
(52) U.S. Cl. .............................. 351/49; 351/158; 349/13
(58) Field of Classification Search .................. 351/113, 351/111, 153, 158, 49; 349/13
  See application file for complete search history.

(56) References Cited

U.S. PATENT DOCUMENTS

| | | | |
|---|---|---|---|
| 3,574,451 A | 4/1971 | Lazazzera | |
| 3,759,608 A | 9/1973 | McVeigh | |
| 3,874,775 A | 4/1975 | Lazarus | |
| 5,155,507 A | 10/1992 | Ford | |
| 5,276,471 A | 1/1994 | Yamauchi et al. | |
| 6,145,985 A * | 11/2000 | De Marchi et al. | 351/153 |
| 7,073,904 B2 * | 7/2006 | Chene et al. | 351/153 |
| 7,621,633 B1 * | 11/2009 | Foster | 351/51 |

FOREIGN PATENT DOCUMENTS

| | | |
|---|---|---|
| JP | 04-023581 A | 1/1992 |
| JP | 2001-305475 A | 10/2001 |
| JP | 2006-091641 A | 4/2006 |
| JP | 2007-240700 A | 9/2007 |

OTHER PUBLICATIONS

European Search Report EP 10176210, dated Jan. 19, 2011.

* cited by examiner

*Primary Examiner* — Hung Dang
(74) *Attorney, Agent, or Firm* — Lerner, David, Littenberg, Krumholz & Mentlik, LLP

(57) ABSTRACT

Glasses of present invention includes a frame portion which includes an opening through which an image displayed on a displaying device is viewed with bilateral eyes, a temple portion configured to be capable of being opened and closed against the frame portion and which includes spring material capable of being inelastically deformed, a movable portion arranged at one of the temple portion and the frame portion and which contacts to the other of the temple portion and the frame portion when the temple portion is opened to the maximum while the contacting position is movable, and a contacting portion which is arranged at the other of the temple portion and the frame portion and which contacts to the movable portion when the temple portion is opened to the maximum and varies the maximum open amount of the temple portion corresponding to movement of the movable portion.

5 Claims, 14 Drawing Sheets

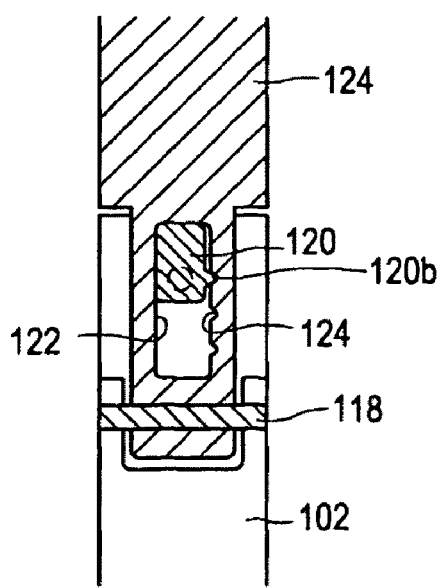 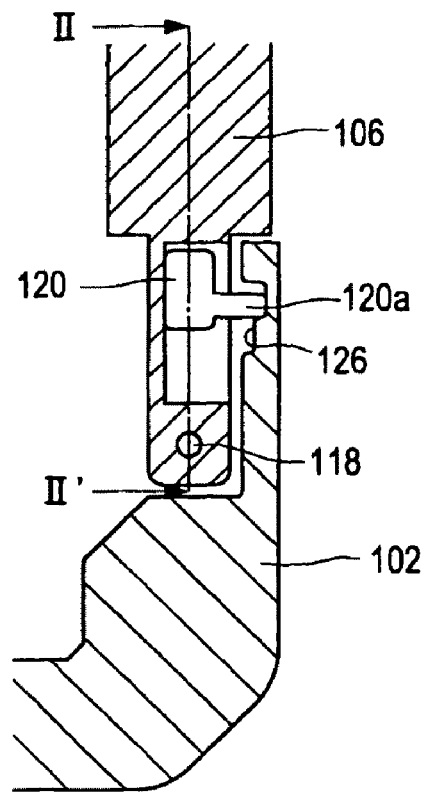
FIG.8A  FIG.8B
FIG.9
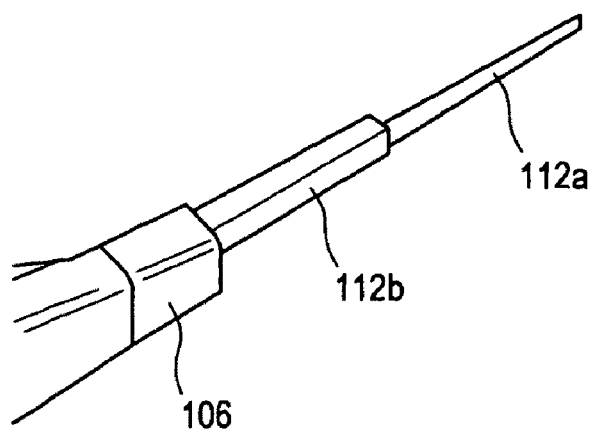

IN THE CASE OF ADULT

IN THE CASE OF CHILD

GLASSES FOR IMAGE VIEWING

CROSS-REFERENCE TO RELATED APPLICATION

The present application claims priority from Japanese Patent Application No. JP 2009-216816 filed in the Japanese Patent Office on Sep. 18, 2009, the entire content of which is incorporated herein by reference.

BACKGROUND OF THE INVENTION

1. Field of the Invention

The present invention relates to glasses for image viewing.

2. Description of the Related Art

In the related art, it has been performed that an glasses-shaped holder utilizing two polarizing plates respectively having different polarizing angle and two liquid crystal shutters capable of alternately switching polarization states as being synchronized with images for the left and right is to be worn to a head while displaying the image for the left eye and the image for the right eye when viewing a three-dimensional video. Further, and head-mounted type display devices for viewing virtual reality and for directly viewing a small-sized liquid crystal panel video via an optical system such as a mirror have been generally known.

For example, in Japanese Patent Application Laid-Open No. 2001-305475, pupil positions and an optical axis are to be aligned by a nose pad portion (retaining portion) to support eyeglass frame as being contacted to a temple portion (ear-hook) of the frame and a nose. Further, in Japanese Patent Application Laid-Open No. 4-23581, suitability for persons of different head sizes and wear comfort have been enhanced by arranging a slide mechanism for varying temple width at an upper part of an glasses-shaped holder.

As disclosed in Japanese Patent Application Laid-Open No. 2007-240700, a nose pad portion for an ordinary visual correction eyeglass frame is formed by joining a thin pad arm with a rim portion by brazing and the like in many cases. Then, in some cases, it is possible to replace the pad to be attached. In most cases, the nose pad portion is fixed to the eyeglass frame (rim portion) and is arranged at a nose upper part (inner corners of eyes) without extending off an eyeglass frame outline. In Japanese Patent Application Laid-Open No. 2006-91641, a nose pad portion is formed to be saddle-shaped and a resin-made attachment is formed replaceable as being inserted and released.

SUMMARY OF THE INVENTION

An ordinary eyeglass frame and a temple portion are often made of metal (such as nickel-titanium alloy, gold and shape memory alloy) or plastic (such as acetate and superelasticity plastic). In this case, special skillful techniques, tools and jigs are necessary to perform fine adjustment (inelastic deformation) of the shape.

In order to view a three-dimensional video, it is necessary that an image for the left eye and an image for the right eye are displayed and an glasses-shaped holder including two polarizing plates respectively having different polarizing angle and two liquid crystal shutters capable of alternately switching polarization states as being synchronized with images for the left and right is worn at a head. In order to be supplied with a television as an accessory, it is necessary that one attached eyeglass holder supports users respectively having different head width for both children and adults without regard to males and females including visual correction glasses wearers.

In the above related art, it is not considered to support various head sizes. In Japanese Patent Application Laid-Open No. 4-23581, the temple width varying mechanism is arranged against the head width. However, since lightening is also required, it is not preferable that a complicated movable mechanism is arranged at the upper part of the eyeglass holder. Further, in the case of fitting (glasses adjustment) of an ordinary visual correction glasses holder, it is not considered that a user oneself performs fine adjustment of the shape accompanying inelastic deformation from an initial shape at a temple portion (ear-hook portion), a nose pad portion and the like for users of different head width without special skillful techniques, tools and jigs.

In light of the foregoing, it is desirable to provide a novel and improved glasses for image viewing capable of being worn corresponding to various head sizes for viewing images.

According to an embodiment of the present invention, there is provided glasses for image viewing includes a frame portion which includes an opening through which an image displayed on a displaying device is viewed with bilateral eyes, a temple portion which is configured to be capable of being opened and closed against the frame portion and which includes spring material capable of being inelastically deformed, a movable portion which is arranged at one of the temple portion and the frame portion and which contacts to the other of the temple portion and the frame portion when the temple portion is opened to the maximum while the contacting position is movable, and a contacting portion which is arranged at the other of the temple portion and the frame portion and which contacts to the movable portion when the temple portion is opened to the maximum and varies the maximum open amount of the temple portion corresponding to movement of the movable portion.

In this configuration, the contacting portion is constituted with plural planes of which positions are different against the opening direction of the temple portion.

In this configuration, the movable portion includes a protrusion which contacts to the contacting portion, and the contacting portion is a bottom face of a groove to which the protrusion is inserted.

In this configuration, the movable portion is a rotating member which rotates around a rotation shaft.

In this configuration, the movable portion is a slide member which slides in a predetermined direction.

According to the present invention, the glasses for viewing images can be worn corresponding to various head sizes.

BRIEF DESCRIPTION OF THE DRAWINGS

FIG. 8A is a schematic view which illustrates an example of an adjustment mechanism constituted with a slide piece;

FIG. 8B is a schematic view which illustrates an example of an adjustment mechanism constituted with a slide piece;

FIG. 9 is an exploded perspective view which illustrates the configuration of the temple;

DETAILED DESCRIPTION OF THE EMBODIMENT(S)

Figure 1:
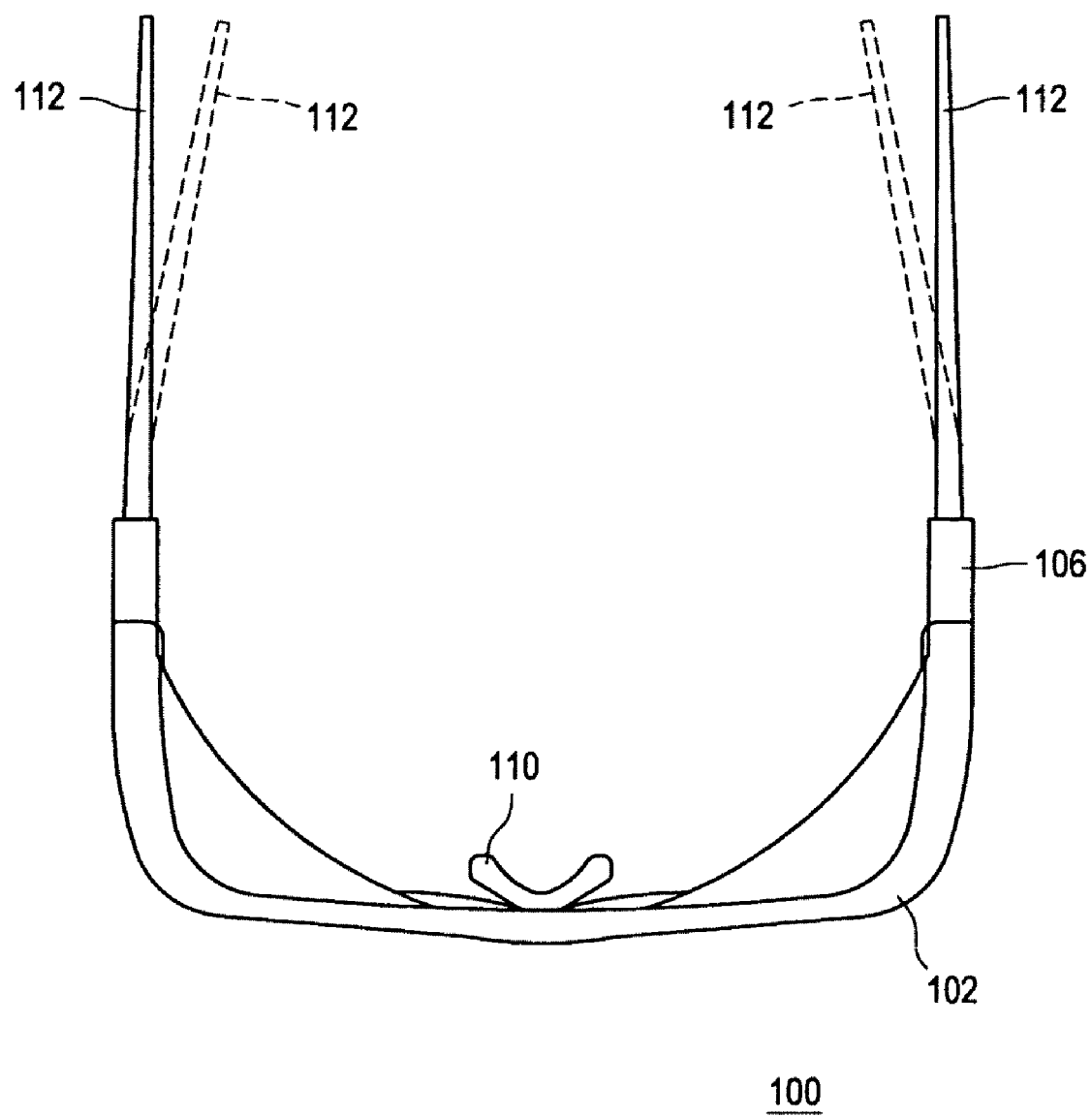
FIG. 1 is a top view viewing from the upper side of an glasses-shaped liquid crystal shutter holder.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Here, description will be made in the following order.
1. Structural example of shutter glasses
2. Configuration of temple angle adjustment
3. Fitting of glasses

[1. Structural Example of Shutter Glasses]

Figure 2:
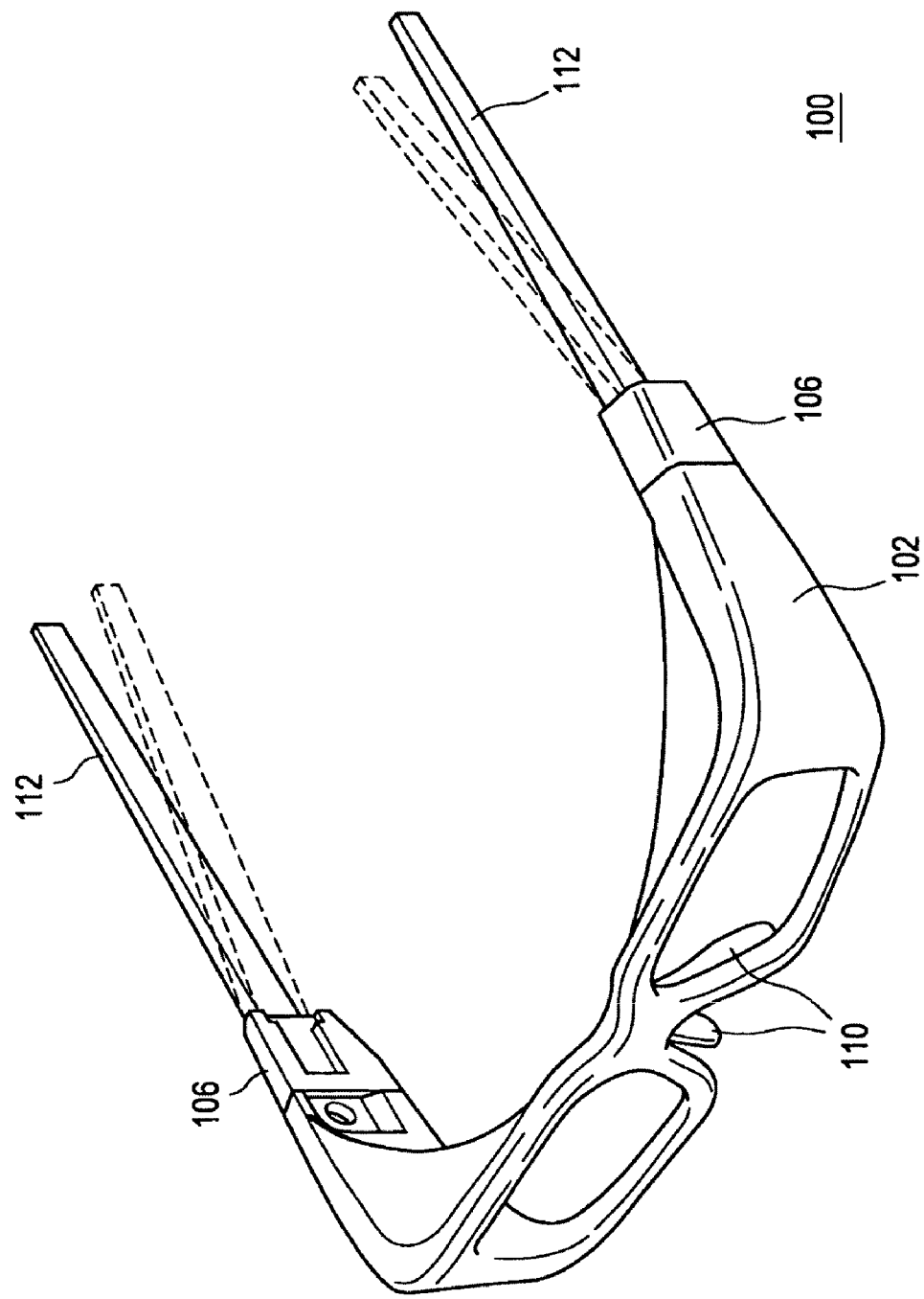
FIG. 2 is a perspective view of the glasses-shaped liquid crystal shutter holder.
Figure 3:
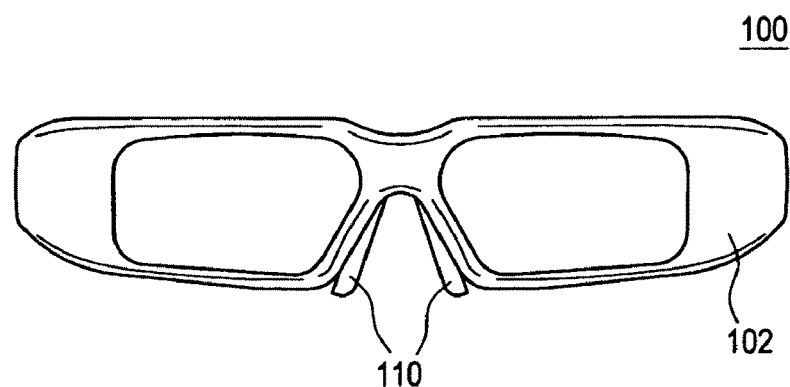
FIG. 3 is a front view of the glasses-shaped liquid crystal shutter holder.
Figure 4:
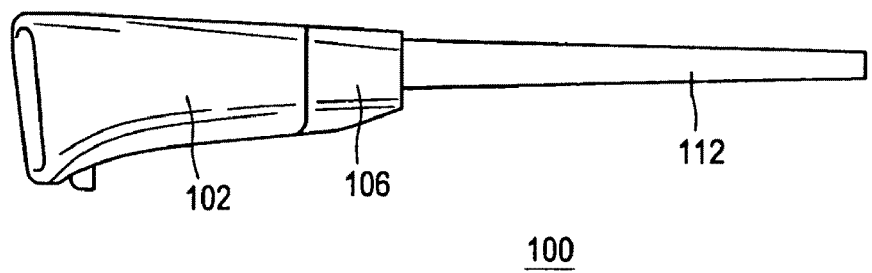
FIG. 4 is a right side view of the glasses-shaped liquid crystal shutter holder.

FIGS. 1 to 5 are schematic views illustrating an glasses-shaped liquid crystal shutter holder (liquid crystal shutter glasses) 100 according to the present embodiment. The glasses-shaped liquid crystal shutter holder 100 is worn on a head and utilized for viewing a display (displaying device) which displays an image for the left eye and an image for the right eye and for viewing a three-dimensional (3D) video. The glasses-shaped liquid crystal shutter holder 100 accommodates two polarizing plates respectively having different polarizing angle and two liquid crystal shutters capable of alternately switching polarization states being synchronized with images for the left and right. In addition, the glasses-shaped liquid crystal shutter holder 100 accommodates an infrared light detecting unit to detect infrared light transmitted from the display side, a driving circuit of the liquid crystal shutters and a battery for the driving, and the like. FIG. 1 is a top view of the glasses-shaped liquid crystal shutter holder 100 viewed from above. FIG. 2 is a perspective view of the glasses-shaped liquid crystal shutter holder 100. FIG. 3 is a front view of the glasses-shaped liquid crystal shutter holder 100. FIG. 4 is a right side view of the glasses-shaped liquid crystal shutter holder 100.

The glasses-shaped liquid crystal shutter holder 100 according to the present embodiment is configured to be capable of being worn over ordinary visual correction glasses in a state that the visual correction glasses are worn by a user. In addition, the glasses-shaped liquid crystal shutter holder 100 is configured to be capable of being worn corresponding to size of various heads and faces of both children and adults.

FIG. 1 illustrates an outline of the glasses-shaped liquid crystal shutter holder 100. Both end parts (armor parts) of an eyeglass frame 102 molded of resin are formed being curved faces. A frame end of each of the both end parts is connected to a temple holder portion 106 via a hinge portion. The temple holder portion 106 is capable of being folded with the hinge portion.

A nose pad portion 110 is fixed to the eyeglass frame 102. The nose pad portion 110 has a saddle-like shape contacting to a nose at the vicinity of some midpoint of the nose not to interfere with a nose pad portion of visual correction glasses worn at the inner side of the glasses-shaped liquid crystal shutter holder 100. Meanwhile, it is common for a nose pad portion of visual correction glasses to contact to a nose at the upper part thereof (inner corners of eyes) where the right eye and left eye are most adjacent to each other so as to minimize exposure thereof to the outside. The nose pad portion 110 is formed of metal spring material such as stainless steel as a core at the inside and a soft resin covering the core at the surface. With this configuration, the nose pad portion 110 is capable of finely adjusting a pad face (contact inclination face) to a nose and pressure to a nose corresponding to each user by applying specific load capable of deforming inelastically. In addition, the nose pad portion 110 has a function to maintain a stably worn state while avoiding leaving a pressure imprint to a nose.

A temple 112 is formed integrally with a temple holder 106 or is connected to the temple holder 106 with a screw and the like. The temple 112 is formed of metal spring material such as stainless steel as a core at the inside so that the shape of a temple end part (vicinity of a tip part) contacting to a head back or an ear is finely adjustable. In the present embodiment, wear comfort can be enhanced by combining rough changing of a temple width with a later-mentioned rotational ratchet mechanism and the like and fine adjusting by a user oneself.

[2. Configuration of Temple Angle Adjustment]

Figure 5:
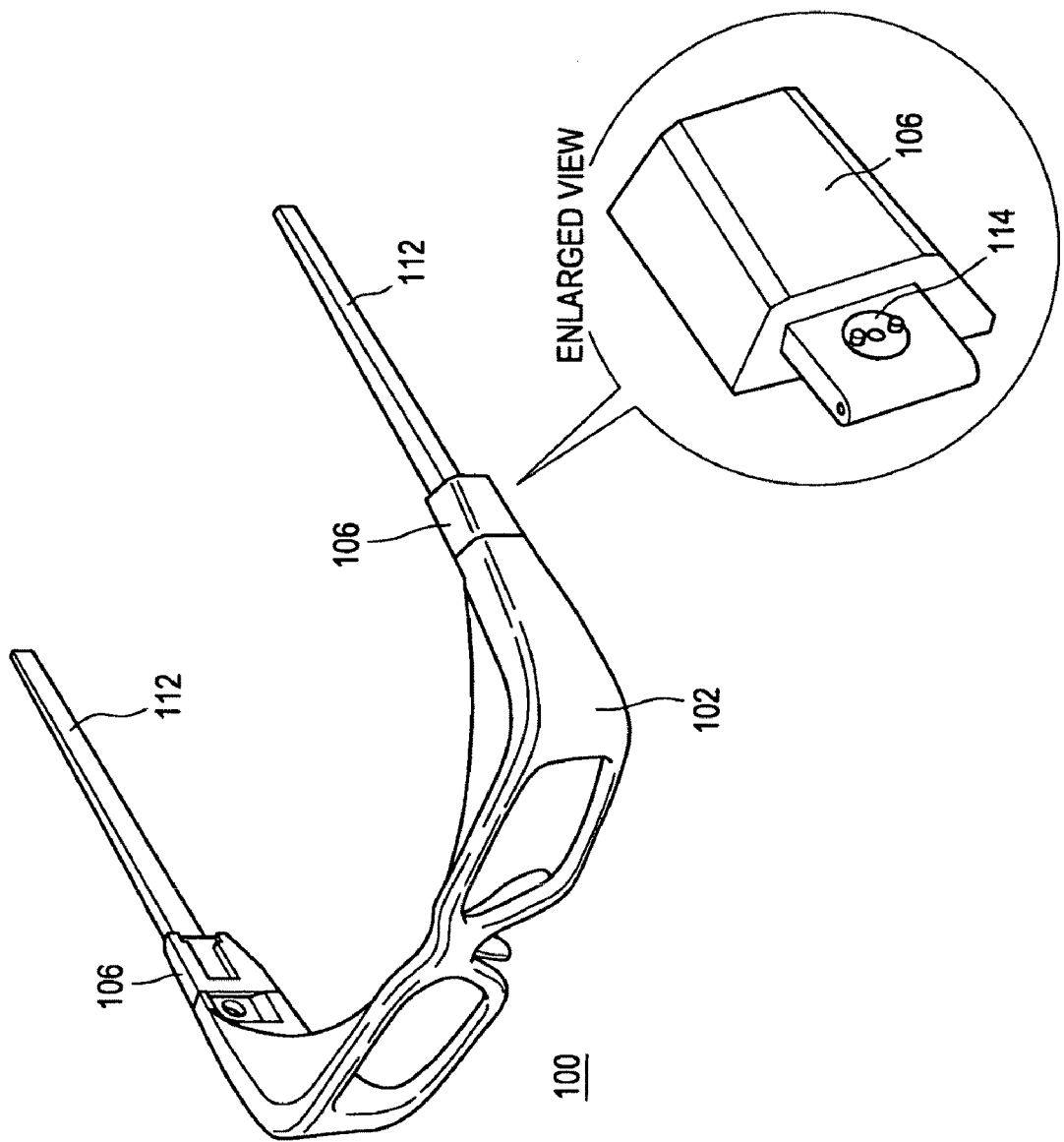
FIG. 5 is a perspective view of the glasses-shaped liquid crystal shutter holder with a schematic view enlarging a state that a temple holder is removed.
Figure 6:
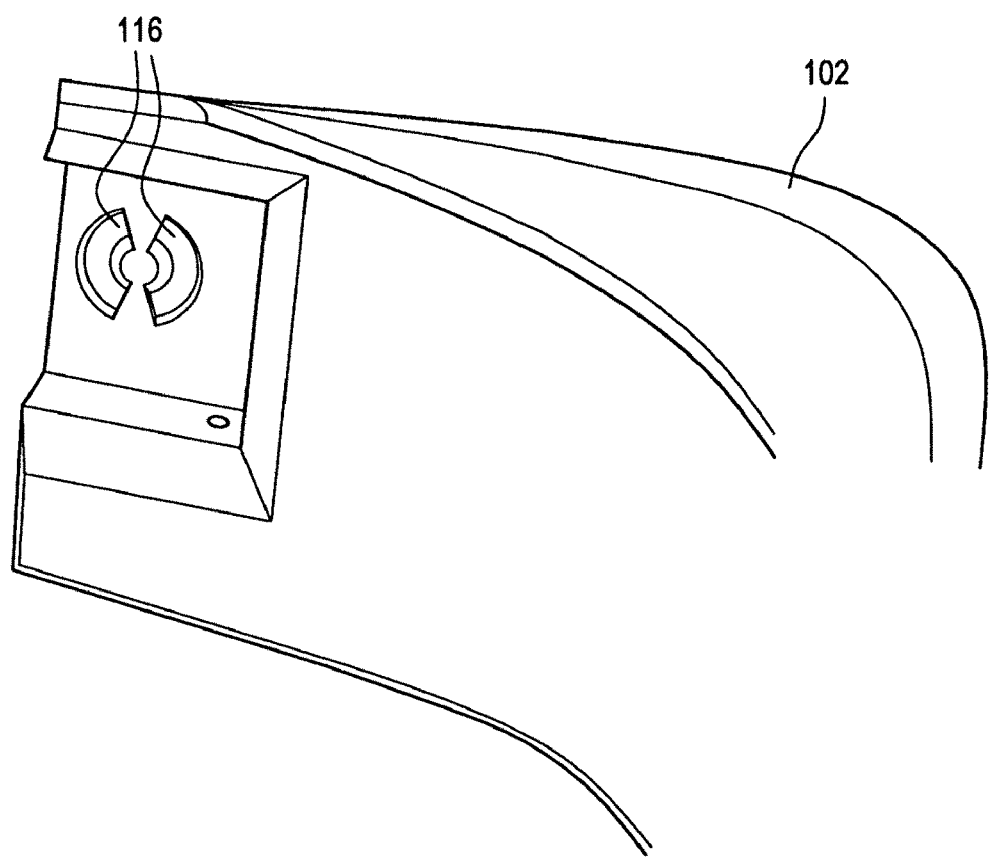
FIG. 6 is a schematic view which illustrates a part to which the temple holder of an eyeglass frame is attached viewing from the inside of the eyeglass frame.

Next, the configuration of temple angle adjustment will be described. FIG. 5 is a perspective view of the glasses-shaped liquid crystal shutter holder 100 with a view enlarging a state that the temple holder 106 is removed (enlarging view). FIG. 6 is a view illustrating a part to which the temple holder 106 of the eyeglass frame 102 is attached viewing from the inside of the eyeglass frame 102.

As illustrated in FIG. 5, a cylindrical rotating member 114 is attached to the temple holder 106 and is configured to be capable of being rotated having the center axis as the rotation center. Further, as illustrated in FIG. 6, at a part to which the temple holder 106 of the eyeglass frame 102 is attached, a groove (concave portions) 116 is arranged at the position corresponding to the rotating member 114. As illustrated in FIG. 6, the grooves 116 are formed arc-shaped against the rotation center of the rotating member 114. The grooves 116 having the same shape are arranged respectively at two positions completely opposed to each other against the rotation center of the rotating member 114. The depth of the grooves 116 is formed so as to be varied stepwise along the circumferential direction of the arc thereof.

Figure 7A:
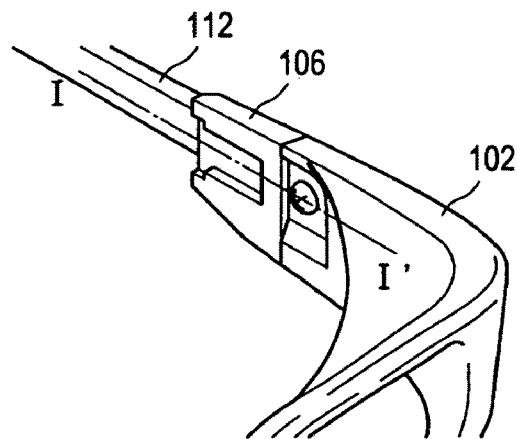
FIG. 7A is a schematic view which illustrates details of the configuration of angle adjustment structure of the temple.
Figure 7B:
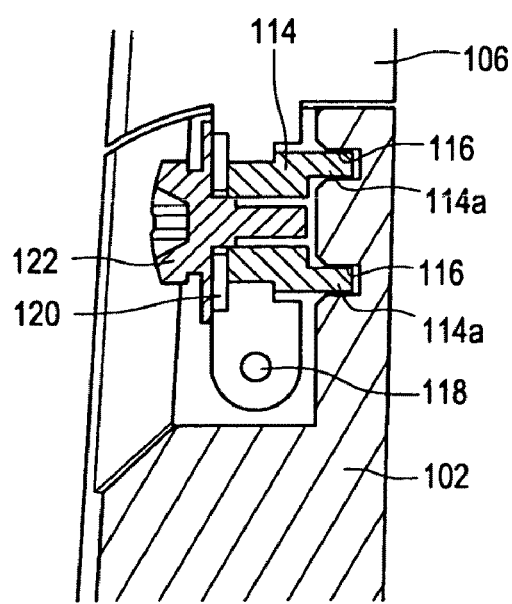
FIG. 7B is a schematic view which illustrates details of the configuration of angle adjustment structure of the temple.
Figure 7C:
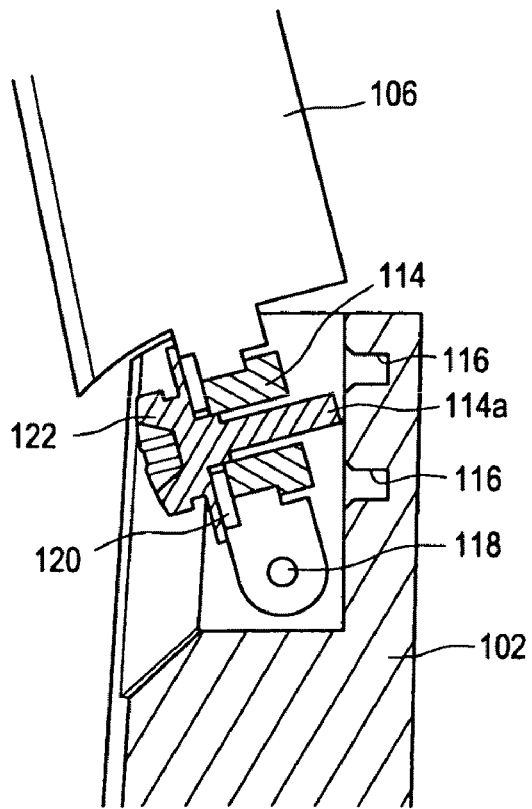
FIG. 7C is a schematic view which illustrates details of the configuration of angle adjustment structure of the temple.

FIGS. 7A, 7B and 7C are explanatory views schematically illustrating details of the configuration of temple angle adjustment. Here, FIG. 7A is a perspective view illustrating a connecting portion between the eyeglass frame 102 and the temple holder 106. FIG. 7B and 7C are schematic sectional views sectioned along a chain line I-I' in FIG. 7A. FIG. 7B illustrates a case that the position of a protrusion 114a of the rotating member 114 corresponds to the position of the concave portion 116. FIG. 7C illustrates a case that the protrusion 114a of the rotating member 114 positions where the concave portion 116 is not formed.

As illustrated in FIGS. 7B and 7C, the temple holder 106 is capable of being rotated around a rotation shaft 118 against the eyeglass frame 102 and the hinge portion is constituted with the rotation shaft 118. Accordingly, the temple holder 106 and the temple 112 are capable of being folded with the hinge portion.

Further, the rotating member (cam) 114 is attached to the temple holder 106 as being fastened with a screw 122 as sandwiching a plate spring 120. Accordingly, the rotating member 114 is capable of being rotated against the temple holder 106 while causing slide resistance due to the plate spring 120. When an angle position is determined, the position is maintained by the slide resistance of the plate spring 120. The protrusion 114a is arranged respectively at the end parts of the rotating member 114 at two positions thereof as being completely opposed to each other.

The two grooves 116 of the eyeglass frame 102 are arranged along loci of the protrusions 114a when the rotating member 114 is rotated. In the case that the protrusion 114a is located at the deepest position of the groove 116 in accordance with the angle position of the rotating member 114, the protrusion 114a is in a state of being completely inserted into the groove 116, as illustrated in FIG. 7B. Here, the open angle of the temple holder 106 is to be the maximum. In the case that the protrusion 114a is located at the position where the groove 116 is not formed in accordance with the angle position of the rotating member 114, the protrusion 114a contacts to a plane where the groove 116 is not formed, as illustrated in FIG. 7C. Here, the open angle of the temple holder 106 is to be the minimum.

The depth of the groove 116 is set to be different for each predetermined angle. A groove of a minus shape is formed at the head of the screw 122 as an example. The screw 122 and the rotating member 114 can be rotated together by rotating the screw 122 as being engaged with a straight slot screwdriver, a coin and the like with the groove. For example, when the screw 122 is rotated by 60 degrees from a state that the protrusion 114a is located at the deepest position of the groove 116, the protrusion 114a is moved to a position being shallow by one step therefrom. Then, it is possible to set the depth of the groove 116 so that the open angle of the temple holder 106 (hinge angle) is narrowed by about 2.5 degrees, for example, when the protrusion 114a is located at the position being shallow by one step. In addition, when the protrusion 114a is contacted to the plane where the groove 116 is not formed, the open angle of the temple holder 106 (hinge angle) is further narrowed by about 2.5 degrees. With this configuration, two-step adjustment of the open angle (about 5 degrees) can be performed, so that the width between the two temples 112 can be adjusted to be narrower than that of the initial setting.

In the above example, the rotating member 114 is provided with the two protrusions 114a. However, the number of the protrusions 114a may be one, three or more. Further, the adjustment mechanism of the open amount of the temple 112 with the above rotating member 114 is described as an example. The similar function may also be achieved with a configuration to insert a slide piece and to insert and release a mountain-shaped portion having plural summits.

FIGS. 8A and 8B are schematic views illustrating an example of the adjustment mechanism constituted with a slide piece. Similar to FIGS. 7B and 7C, FIG. 8B is a schematic sectional view sectioned along the chain line I-I' in FIG. 7A. FIG. 8A is a schematic sectional view sectioned along a chain line II-II' in FIG. 8B.

As illustrated in FIG. 8A, an opening 122 is arranged at the end part of the temple holder 106, and then, a slide piece 120 is inserted into the opening 122. The slide piece 120 is capable of reciprocating within the opening 122 in the direction along the chain line II-II'. A protrusion 120a is arranged at the slide piece 120 at the side opposing to the frame 102. A groove 126 having depth thereof varied stepwise is arranged at the frame 102 at the side opposed to the slide piece 120 along the moving direction of the protrusion 120a. In addition, a protrusion 120b is arranged at the side face in the width direction of the slide piece 120. The protrusion 120b is engaged with one of plural concave portions 124 arranged corresponding to the depth of the groove 126.

With such a configuration, when the slide piece 120 is slid, the position of the slide piece 120 is defined due to engagement of the protrusion 120b with one of the concave portions 124. Then, since the depth of the groove 126 contacted with the protrusion 120a is varied corresponding to the position of the slide piece 120, the open amount of the temple 112 can be adjusted similarly to the case of FIGS. 7A to 7C.

With above configuration, when the temple width is 175 mm and the length is 130 mm as initial setting and the depth of the groove 126 is arranged into three steps, for example, it is possible to reduce the temple width to 164 mm with the first step adjustment (adjustment of 2.5 degrees). Further, the temple width can be adjusted to 153 mm with the second step adjustment and reduced to 141 mm with the third step adjustment. Accordingly, the glasses-shaped liquid crystal shutter holder 100 can be worn to a person having a small head such as a child. Temple spring pressure capable of performing stable attaching can be provided due to the adjustment of the nose pad portion 110 and the temple width without causing uncomfortable feeling even for a user having a different head size. The temple spring pressure is preferably in the order of 80 to 120 grams. This suggested pressure is an average value obtained through a result of wearing test by plural persons.

Further, since the temple width can be adjusted by the rotating member 114, it is possible to suppress excessive temple spring pressure applied to a head compared to the case of adjusting only by elasticity of the temple 112.

[3. Fitting of Glasses]

Figure 10:
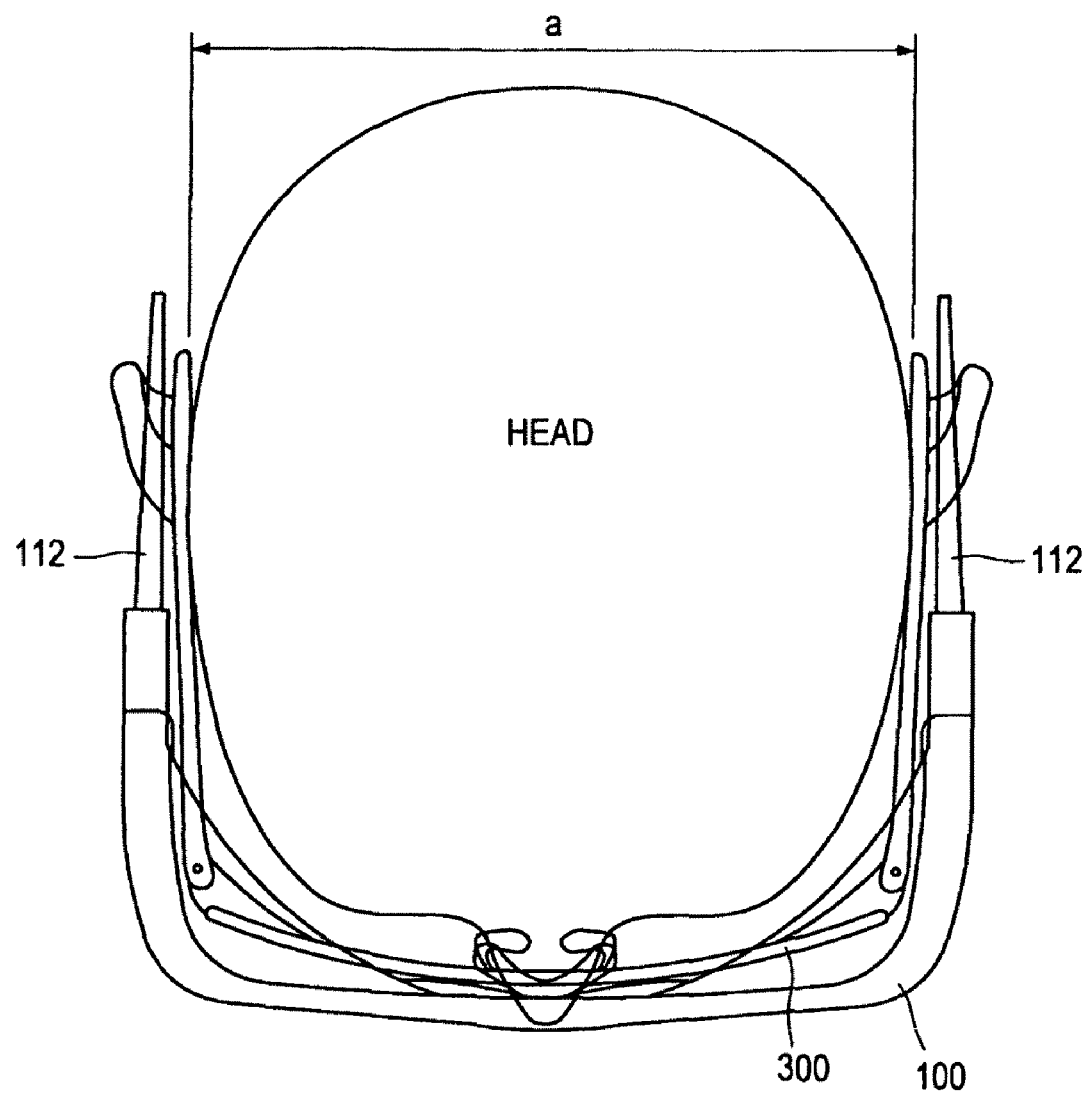
FIG. 10 is a schematic view which illustrates standard dimensions applied to visual correction glasses.
Figure 11:
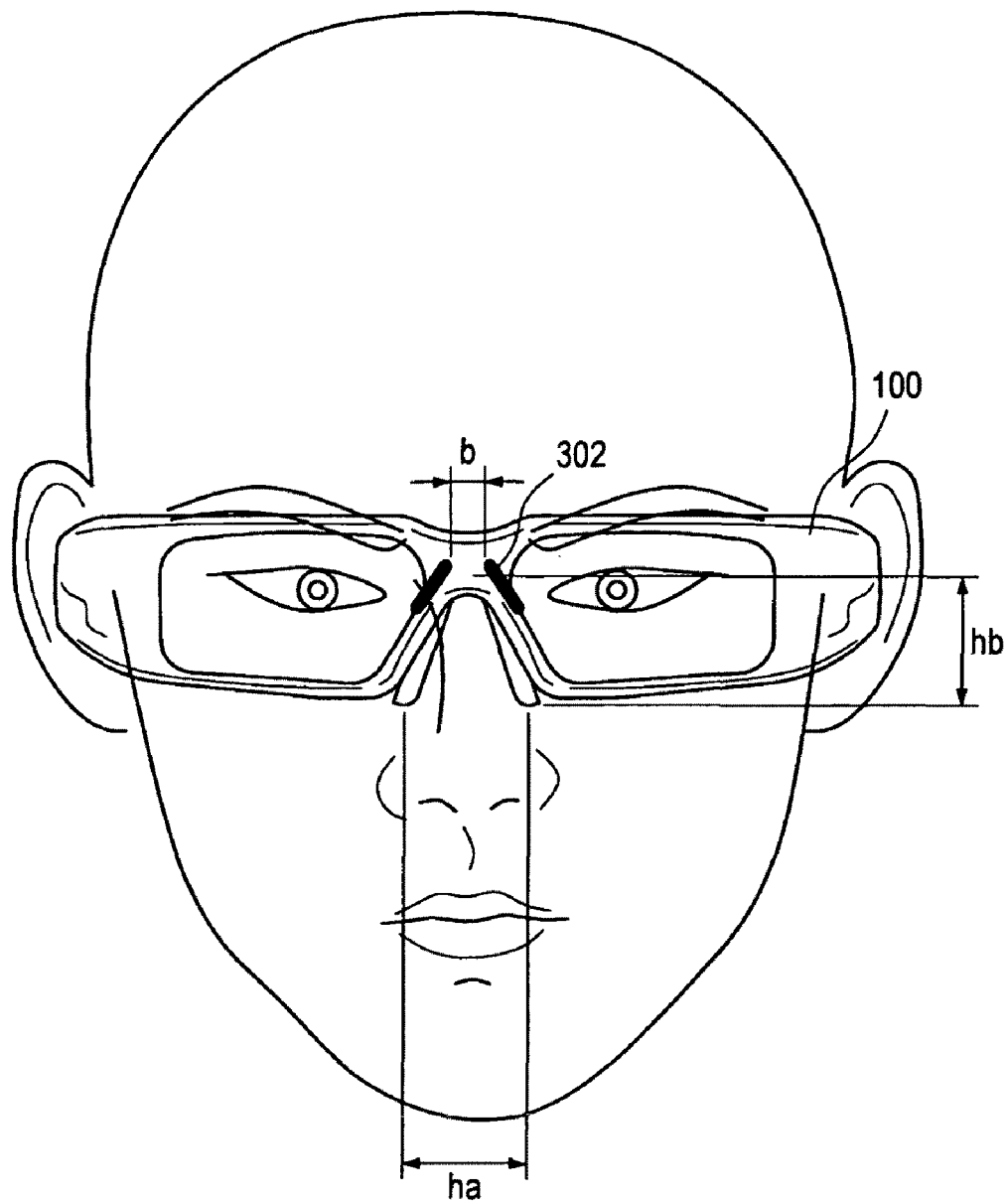
FIG. 11 is a schematic view which illustrates standard dimensions applied to visual correction glasses.
Figure 12:
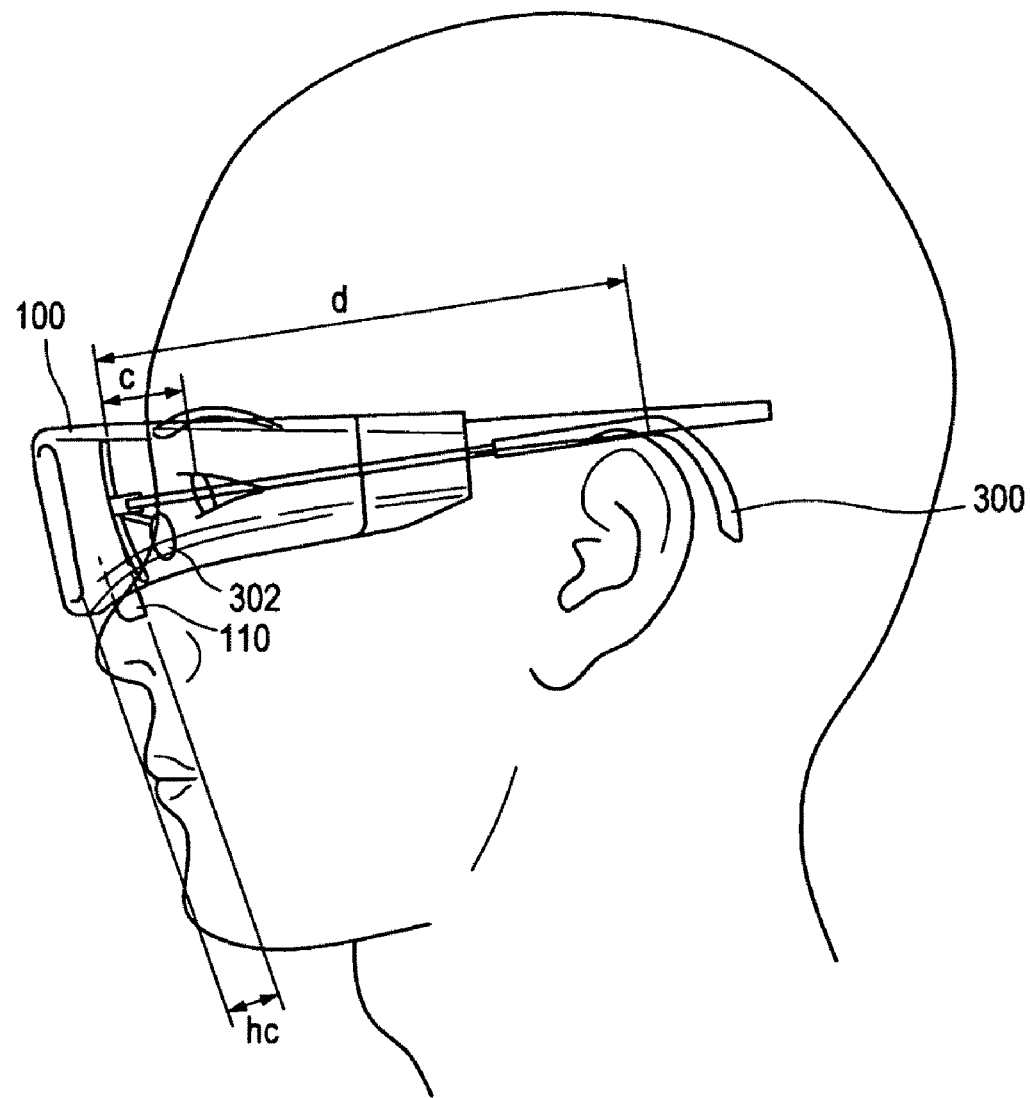
FIG. 12 is a schematic view which illustrates standard dimensions applied to visual correction glasses.

FIGS. 10 to 12 are schematic views illustrating standard dimensions applied to visual correction glasses. FIGS. 10 to 12 illustrate a state that the glasses-shaped liquid crystal shutter holder 100 is worn over visual correction glasses 300. In FIG. 10, distance "a" denotes a dimension of head width. The statistical average value of distance "a" of female and male adults is from 152 to 160 mm. The maximum value of "a" is about 174 mm and the minimum value is about 140 mm. Accordingly, the adjustable range is to be 34 mm. In order to enhance wear comfort for plural users respectively having a different head size with one glasses holder, the temple width is required to be adjusted with a variable range of some extent.

Distance "b" shown in FIG. 11 denotes width of a nose and is dependent on largeness of lenses and frame-shape design of the visual correction glasses. Width between pupils having the average value between 61 to 64 mm has a range between the maximum value of 71 mm and the minimum value of 61 mm. Being dependent on lens-frame-shape design, the nose width (rolling width) left between lens frames is in the order of 14 to 19 mm. In most cases, a nose pad portion of ordinary visual correction glasses is arranged at an upper part of a nose being at the vicinity of inner corners of eyes without extending off an eyeglass frame from a design viewpoint.

In the case of being assumed to be worn over ordinary visual correction glasses, the glasses-shaped liquid crystal shutter holder 100 is prepared to be a size larger than the frame of the visual correction glasses, and then, the shape and arranging position of the saddle-shaped nose pad portion 110 are optimally arranged. Accordingly, the contact position of the nose pad portion 110 of the glasses-shaped liquid crystal shutter holder 100 to a nose can be arranged not to interfere with the visual correction glasses, so that double wearing can be performed.

Distance "c" shown in FIG. 12 denotes distance from an apex of a cornea of a person wearing the glasses to the back face of the lens. The general standard value thereof is to be 12 mm for visual correction. Distance "d" shown in FIG. 12 denotes length of a temple from the back face of the lens of the visual correction glasses to an ear. In general, the adjustment range of the temple width corresponding to the head width is said to be from 20 to 80 mm, and preferably, to be about 40 mm. In order to support the above, ordinary visual correction glasses often adopt a temple made of elastic alloy or resin which are relatively expensive. In the present embodiment, the glasses-shaped liquid crystal shutter holder 100 is worn at a head by utilizing combination of adjustment of the temple width and adjustment of the nose pad portion 110. At that time, by combining rough arrangement to a head width due to temple width adjustment and fine adjustment of the nose pad portion 110 for an individual user, the pressing pressure to the head is evened and the wear comfort (fit feeling) are to be remarkably enhanced. The bilateral temples of the visual correction glasses are not necessarily parallel to each other. There may be a case that the temple width is enlarged toward the ear side (back side of the face) corresponding to face width of a wearer. In many cases, the top end (tip part) of the temple is curved inward than a straight line to be fitted so as to cover a head back.

Fitting of visual correction glasses to be adjusted being matched to a user is performed in the following order.

(1) Adjusting positions of bilateral temples and a nose pad
(2) Adjusting distance to an ear from the nose pad and a temple
(3) Adjusting inclination angle of a lens
(4) Determining a position where a lens center is located at a frame In order to optimally perform lens position adjustment with adjustment of temples, bilateral nose pads and the like, some visual correction glasses adopt an elastic member made of titanium alloy having a small elastic coefficient or Ni—Ti base shape-memory alloy and the like as examining materials to be used for the temple. Further, some visual correction glasses adopt combination of the above elastic member with superelasticity plastic (crystal imide resin) having both flexibility and durability or amorphous thermoplastic (polyetherimide resin) having a large elastic coefficient. Accordingly, there are some visual correction glasses adopting a method or materials having an effect to lessen stress while the temple is flexibly bent without being broken.

Such fitting of the visual correction glasses is assumed to be performed at a manufacture side or a retailer side. In addition, since it is for visual correction, the fitting is performed for a specific single user. Accordingly, the fitting is performed for each individual user to be customized with so-called gauging.

The glasses-shaped liquid crystal shutter holder 100 of the present embodiment is to be used being combined with a 3D television. Therefore, assuming a case of being used at home, it is to be used by users of various head sizes without regard to adults, children, males, and females. Further, there may be a case that a user wears visual correction glasses. Accordingly, the glasses-shape liquid crystal shutter-holder 100 of the present embodiment is to be capable of being worn superimposed to the visual correction glasses.

To address the issue, the temple itself is configured to be capable of being inelastically deformed while the temple open angle is adjusted stepwise by the above ratchet type adjustment mechanism. Accordingly, optimal fitting can be performed for users having various head sizes for both children and adults without regard to males and females.

FIG. 9 is an exploded perspective view illustrating the configuration of the temple 112. The temple 112 is constituted with a spring member 112a made of stainless steel and the like arranged as a core at the inside and is covered by a resin member 112b formed of elastomer and the like at the surface thereof for enhancing fit feeling to be a temple configuration. Here, the spring member 112a and the resin member 112b can be formed by being molded integrally with the temple holder 106. With this configuration, the temple 112 is capable of being inelastically deformed by being bent with a user's hand. The temple 112 is capable of being elastically deformed within a bend-returning range after being inelastically deformed into a desired shape. Therefore, by inelastically deforming the temple 112 to the width slightly smaller than the head width, for example, the temple 112 is slightly expanded due to elastic deformation when being worn at the head. Accordingly, the temple 112 is capable of being maintained at the head by utilizing elasticity. Further, the above temple width adjustment of two to four steps due to rotation of the rotating member 114 is performed as being combined with the deformation of the temple 112. Accordingly, fine adjustment of wear comfort for a user having different head width can be optimally performed. Further, by adopting the spring member 112a made of stainless steel and the like as the core, manufacturing cost can be reduced without using expensive material which is usually used for ordinary glasses. Here, in order to make inelastic deformation easier, it is also possible to form a hole, a cutout and the like at the spring member 112a.

Figure 13:
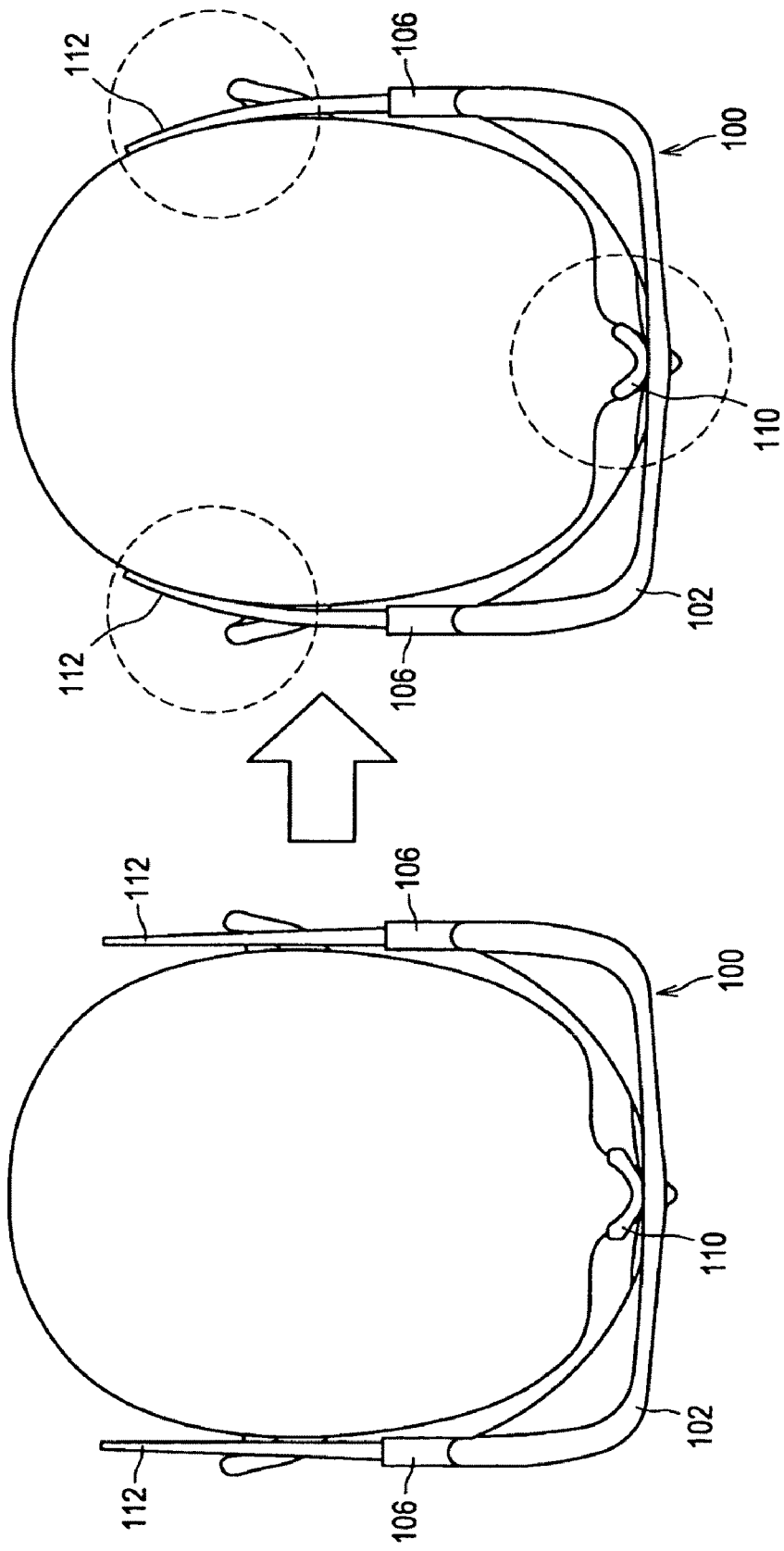
FIG. 13 is a schematic view which illustrates a state that the glasses-shaped liquid crystal shutter holder is worn.
Figure 14:
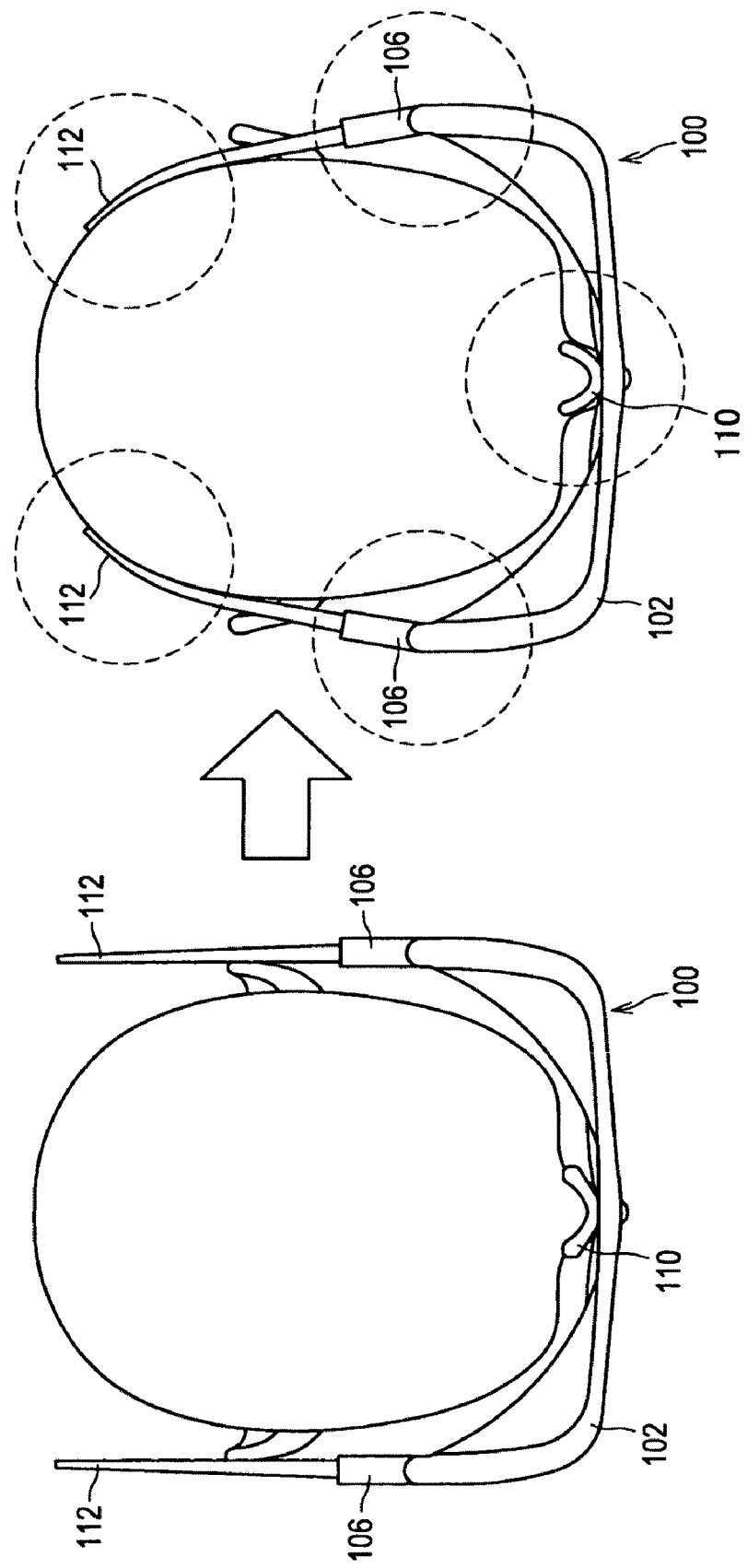
FIG. 14 is a schematic view which illustrates a state that the glasses-shaped liquid crystal shutter holder is worn.

FIGS. 13 and 14 are schematic views illustrating states that the glasses-shaped liquid crystal shutter holder 100 is worn as viewing a user's head from above. The views at the left side in FIGS. 13 and 14 illustrate a state that the fitting of the temple 112 and the nose pad portion 110 is not performed. The views at the right side illustrate a state that the fitting of the temple 112 and the nose pad portion 110 is performed as being deformed to be matched to the head and nose of a user.

FIG. 13 illustrates the case that the user is an adult having a head of an ordinary size of adults. In this case, the protrusion of the rotating member 114 is set at the deepest position of the groove 116, so that the open amount of the temple 112 is to be the maximum. Then, after wearing the glasses-shaped liquid crystal shutter holder 100 at the head, the temple 112 is bent along the head. With the above, the fitting of the glasses-shaped liquid crystal shutter holder 100 to the head can be optimally performed in the case that the user is an adult.

FIG. 14 illustrates the case that the user is a child having a relatively small head. In this case, the protrusion of the rotating member 114 is set at a position where the groove 116 is not formed and the open amount of the temple 112 is to be the minimum. Then, after wearing the glasses-shaped liquid crystal shutter holder 100 at the head, the temple 112 is bent along the head. With the above, the temple width can be sufficiently lessened and the fitting of the glasses-shaped liquid crystal shutter holder 100 to the head can be optimally performed in the case that the user is a child.

The saddle-shaped nose pad portion 110 is configured to be contacted to a nose at a position lower than the position of a nose pad portion used for ordinary glasses. Accordingly, interference between a nose pad portion 302 of the visual correction glasses and the nose pad portion 110 of the glasses-shaped liquid crystal shutter holder 100 can be suppressed and the nose pad portions of the both can be configured to be reliably contacted to the nose.

In the glasses-shaped liquid crystal shutter holder 100 of the present embodiment, being similar to the temple, the saddle-shaped nose pad portion 110 adopts a double structure of a core and a cover member. Spring material such as stainless steel is utilized for the core and the surface thereof is covered with resin material such as elastomer. With this configuration, the nose pad portion 110 is capable of being deformed flexibly including deformation due to twisting in addition to ordinary deformation. Accordingly, optimal fitting can be performed by being optimally deformed by a user.

Figure 15:
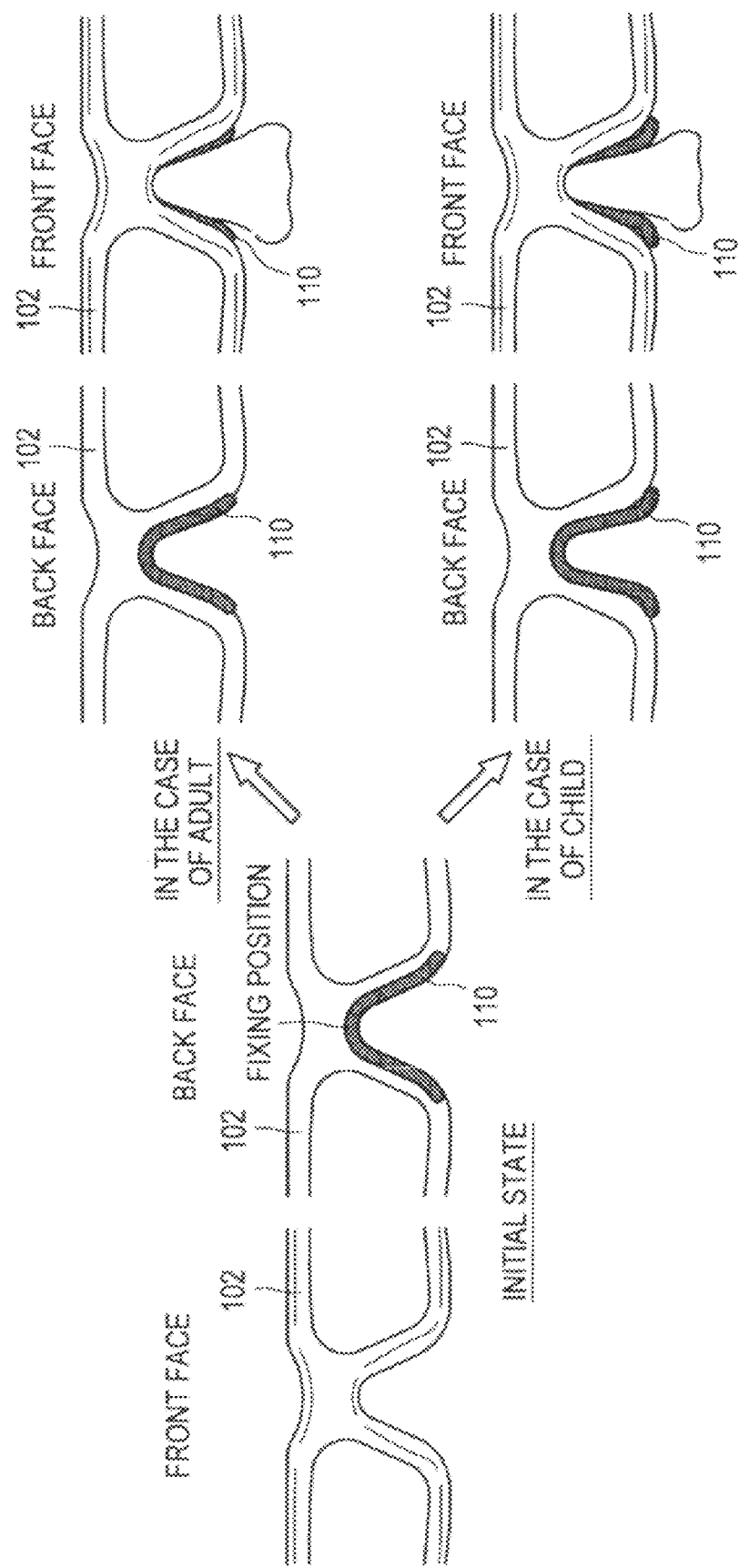
FIG. 15 is a schematic view which illustrates a front face and a back face at the vicinity of a nose pad portion of the glasses-shaped liquid crystal shutter holder.

FIG. 15 is a schematic view illustrating the front face and rear face (side facing to a user's face) at the vicinity of the nose pad portion 110 of the glasses-shaped liquid crystal shutter holder 100. The nose pad portion 110 is fixed to the frame 102 at the vicinity of a fixing position in FIG. 15. In the case that the user is an adult having a relatively large nose in size and width (in the case of ordinary size of an adult), the fitting being matched to the nose size can be performed by adjusting the open amount of the nose pad portion 110 to be large corresponding to the nose width.

Meanwhile, in the case that the user is a child having a relatively small nose in size and width, the fitting being matched to the nose size can be performed by adjusting the open amount of the nose pad portion 110 to be small corresponding to the nose width.

Further, by adjusting the open amount of the nose pad portion 110, the position hb shown in FIG. 11 and the depth hc shown in FIG. 12 of the top end of the nose pad portion 110 can be adjusted. Accordingly, in the case that the glasses-shaped liquid crystal shutter holder 100 is worn over the visual correction glasses, the interference between the nose pad portion of the visual correction glasses and the nose pad portion 110 of the of the glasses-shaped liquid crystal shutter holder 100 can be suppressed. In addition, the glasses-shaped liquid crystal shutter holder 100 can be located appropriately in the vertical direction.

Figure 16:
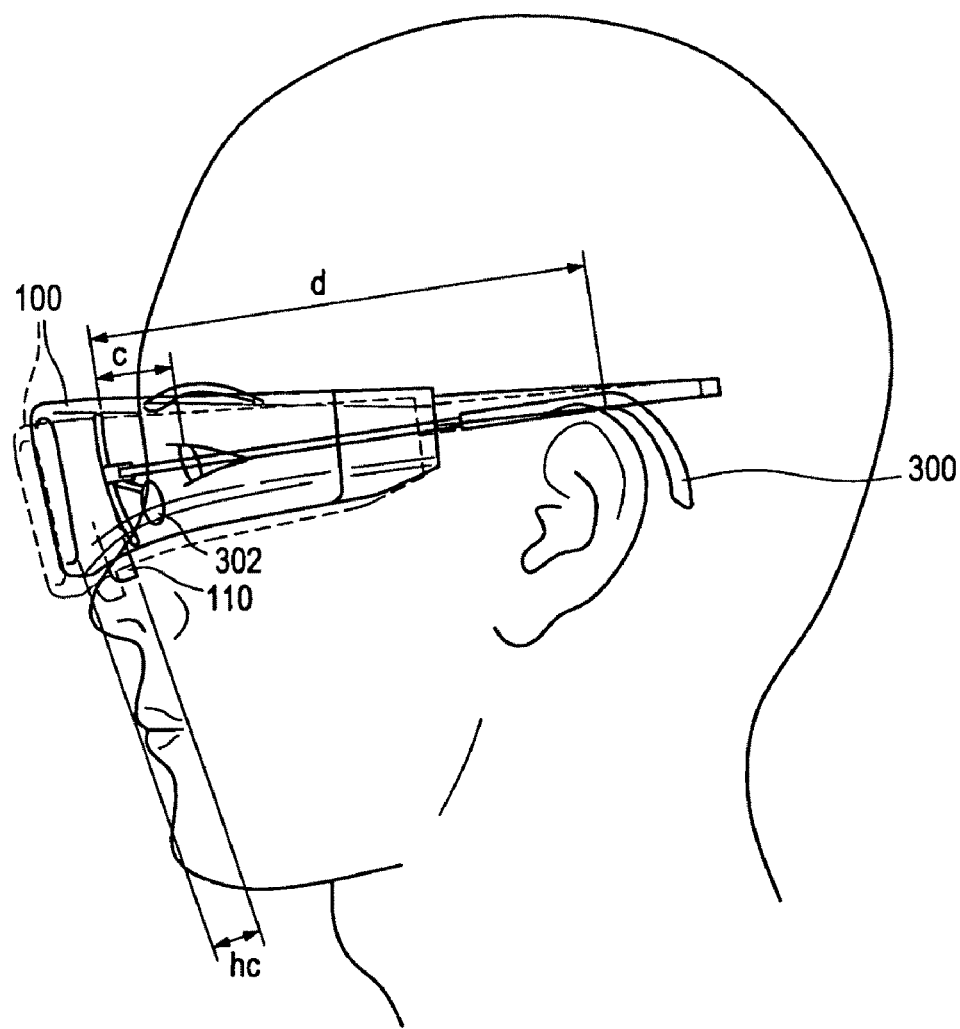
FIG. 16 is a schematic view which illustrates the configuration without a mechanism to adjust an open amount of the nose pad portion as a comparative example.

FIG. 16 illustrates a case without having a mechanism to adjust the open amount of the nose pad portion 110 as a comparative example. In this case, when the glasses-shaped liquid crystal shutter holder 100 is set frontward to prevent interference with the visual correction glasses, there occurs an issue that the glasses-shaped liquid crystal shutter holder 100 is to be displaced downward. Since the open position of the liquid crystal shutter is shifted downward in this case, there occurs an issue that a part of video of the display lacks.

The glasses-shaped liquid crystal shutter holder 100 according to the present embodiment is capable of adjusting the open amount as the nose pad portion 110 being sufficiently long. Accordingly, even in the case that the glasses-shaped liquid crystal shutter holder 100 is being apart from the visual correction glasses, the liquid crystal shutter can be aligned with the optical axis by adjusting the width ha, the position hb and the depth hc of the top end of the nose pad portion 110.

Here, the open amount ha of the nose pad portion 110 is set to be opened larger than the nose pad portion of the visual correction glasses in order to suppress interference with the visual correction glasses. The width of the nose pad portion (width b in FIG. 10) of the visual correction glasses is formed in the order of 16 to 18 mm as the average value of nose width. The nose width is in the order of 14 to 15 mm for glasses for children. When including young children, the minimum width is about 12 mm. Accordingly, by arranging to be capable of adjusting the open amount ha to be equal to or larger than 12 mm, the glasses-shaped liquid crystal shutter holder 100 can be worn over any visual correction glasses for both children and adults.

As being worn over the visual correction glasses, the glasses-shaped liquid crystal shutter holder 100 is required to be a size larger than the standard shape of the visual correction glasses. Accordingly, the part of the nose pad portion 110 contacting to a nose is required to be set downward, so that the contacting width ha of the top end at the nose lower part is to be about 20 mm. The top end is located at the position lower than the optical axis by about 25 mm (=hb). Regarding the distance direction against the cornea surface, since standard distance to the back face of an ordinary eyeglass lens is 12 mm, the height hc is preferably to be equal to or larger than 13 mm so that the back face of the glasses-shaped liquid crystal shutter holder 100 is prevented from being contacted to the eyeglass lens and frame, in the present embodiment capable of being worn in double. Here, it is also required to consider the relation with habitual wearing positions of ordinary visual correction glasses wearers. However, even though the optical axis is slightly displaced with glasses due to positional arrangement of the large glasses-shaped liquid crystal shutter holder 100 and the nose pad portion 110, no issue occurs in performance for viewing a three-dimensional video.

By adopting the above configuration, the single glasses-shaped liquid crystal shutter holder 100 can satisfy all needs without regard to adults, children, males, and females. Further, even for visual correction glasses wearers and users having various head sizes, the liquid crystal shutter glasses for viewing a three-dimensional video can be easily worn and the wear comfort thereof can be enhanced due to combination of the temple width adjustment of two to four steps with the rotational ratchet mechanism or the slide mechanism and the configuration capable of performing fine adjustment without using expensive material. Accordingly, optimization for individual users can be performed due to effects of stepwise temple width adjustment by the ratchet mechanism and spring characteristics of the temple itself against the head width of 140 to 175 mm which is to be the maximum value for adult males and females (including children).

Further, in ordinary operation of wearing and removing, the end part (tip part) of the temple 112 can be adjusted corresponding to a curve matched to head curvature and a curve at an ear while preventing permanent inelastic deformation of the temple 112. Accordingly, the above adjustment and the like can be performed extremely easily by a user oneself.

As described above, according to the present embodiment, the temple portion as an ear-hook portion includes the hinge portion and the rotational ratchet mechanism and is capable of varying the width of contacting a head stepwise. The protrusion 114*a* is arranged at the rotating member 114 to vary the temple width and the groove 116 having depth thereof varied stepwise is arranged at the corresponding face. Then, by the operation to vary the angle of the rotating member 114, the attaching angle between the eyeglass frame and the temple can be varied stepwise. With the above configuration, the stepwise adjustment to a size matched to the order from 140 to 175 mm maximum as the average head width of users from the initial shape can be easily performed by a user oneself. Accordingly, only with attaching one liquid crystal shutter glasses, it is possible to be used for plural users respectively having different head width.

Further, the temple 112 of the eyeglass frame includes the spring member 112a having spring characteristics made of stainless steel and the like as a core at the inside and is covered by the soft resin 112b at the surface thereof. Therefore, fine adjustment of the shape can be performed by applying load to the temple 112 itself to cause inelastic deformation. Accordingly, without using expensive materials and without utilizing skillful techniques, special tools and jigs which are utilized for fine adjustment of ordinary visual correction glasses, fine adjustment can be performed by a user oneself in order to enhance individual wear comfort.

It should be understood by those skilled in the art that various modifications, combinations, sub-combinations and alterations may occur depending on design requirements and other factors insofar as they are within the scope of the appended claims or the equivalents thereof.

What is claimed is:

1. A glasses-shaped liquid crystal shutter holder capable of being worn over ordinary correction glasses for viewing three-dimensional video images, said holder comprising:
   a frame portion having two polarizing plates and two liquid crystal shutters to enable alternating switching polarization states synchronized with the video images for a right eye and a left eye of a user;
   a temple portion which is configured to be capable of being opened and closed against the frame portion and which includes a spring member capable of being inelastically deformed;
   a movable portion which is arranged at one of the temple portion and the frame portion and which contacts to the other of the temple portion and the frame portion when the temple portion is opened to the maximum while a contacting position is movable; and
   a contacting portion which is arranged at the other of the temple portion and the frame portion and which contacts to the movable portion when the temple portion is opened to the maximum and varies the maximum open amount of the temple portion corresponding to movement of the movable portion.

2. The holder according to claim 1, wherein the contacting portion has plural planes with respective varying depths.

3. The holder according to claim 1, wherein
   the movable portion includes a protrusion which contacts to the contacting portion, and
   the contacting portion is a bottom face of a groove to which the protrusion is inserted.

4. The holder according to claim 1, wherein the movable portion is a rotating member which rotates around a rotation shaft.

5. The holder according to claim 1, wherein the movable portion is a slide member which slides in a predetermined direction.

\* \* \* \* \*